United States Patent
Scherzer et al.

(10) Patent No.: US 10,538,624 B2
(45) Date of Patent: *Jan. 21, 2020

(54) PROCESS FOR PRODUCING MONOMER COMPOSITIONS AND USE OF THESE FOR PRODUCING A POLYAMIDE MOLDING

(75) Inventors: Dietrich Scherzer, Neustadt (DE); Philippe Desbois, Edingen-Neckarhausen (DE); Volker Warzelhan, Weisenheim am Berg (DE); Andreas Wollny, Ludwigshafen (DE); Andreas Radtke, Mannheim (DE); Axel Wilms, Frankenthal (DE); Martin Klatt, Mannheim (DE)

(73) Assignee: BASF SE, Ludwigshafen (DE)

( * ) Notice: Subject to any disclaimer, the term of this patent is extended or adjusted under 35 U.S.C. 154(b) by 681 days.

This patent is subject to a terminal disclaimer.

(21) Appl. No.: 13/268,228

(22) Filed: Oct. 7, 2011

(65) Prior Publication Data

US 2012/0088899 A1    Apr. 12, 2012

Related U.S. Application Data

(60) Provisional application No. 61/422,678, filed on Dec. 14, 2010, provisional application No. 61/390,627, filed on Oct. 7, 2010.

(51) Int. Cl.
| | |
|---|---|
| *C08G 69/14* | (2006.01) |
| *C08G 69/18* | (2006.01) |
| *C08G 69/16* | (2006.01) |
| *C08G 69/20* | (2006.01) |

(52) U.S. Cl.
CPC .............. *C08G 69/14* (2013.01); *C08G 69/16* (2013.01); *C08G 69/18* (2013.01); *C08G 69/20* (2013.01)

(58) Field of Classification Search
CPC .......................... C08G 69/14–20; C08G 63/08
USPC .............. 528/323, 326, 354–359; 264/12–14
See application file for complete search history.

(56) References Cited

U.S. PATENT DOCUMENTS

| | | | | |
|---|---|---|---|---|
| 1,647,194 A | * | 11/1927 | Poindexter, Jr. et al. | 264/13 |
| 3,017,392 A | * | 1/1962 | Butler et al. | 528/315 |
| 3,386,943 A | * | 6/1968 | Hedrick et al. | 524/879 |
| 5,760,164 A | * | 6/1998 | Schmid et al. | 528/310 |
| 6,013,758 A | | 1/2000 | Schmid et al. | |
| 6,579,965 B2 | * | 6/2003 | Hoogen et al. | 528/323 |

FOREIGN PATENT DOCUMENTS

| | | | |
|---|---|---|---|
| CS | 191368 B1 | * | 7/1979 |
| DE | 2 040 188 | | 2/1972 |
| DE | 44 04 221 | | 8/1995 |
| EP | 0 408 957 | | 1/1991 |
| EP | 0 786 486 A2 | | 7/1997 |
| EP | 0 872 508 A1 | | 10/1998 |
| FR | 2291231 A1 | * | 6/1976 |
| GB | 1 364 550 | | 8/1974 |
| GB | 2 286 595 | | 8/1995 |
| JP | 9-202854 A | | 8/1997 |
| JP | 9-208692 A | | 8/1997 |
| JP | 2002-146009 A | | 5/2002 |
| KR | 2002-0023654 | | 3/2001 |
| KR | 2009-0090286 | | 8/2009 |

OTHER PUBLICATIONS

Land (Industrial Crystallization of Melts, Marcel Dekker, 2005, Chapter 3: Cooling Belts, pp. 45-77).*
Burroughs et al (Managing Indoor Air Quality, 4th Ed, The Fairmont Press, 2008, p. 145-9).*
International Search Report dated Jan. 9, 2012 in PCT/EP2011/067446 (with English translation of Categories of Cited Documents).
Ludwig Bottenbruch et al., "Technische Thermoplaste Polyamide Kenststoff Handbuch", Carl Hanser Verlag, ISBN 3-446-16486-3, vol. 3/4, 1998, pp. 49-52 with cover page.
Laura Ricco et al., "Anionic Poly(ε-caprolactam): Relationships among Conditions of Synthesis, Chain Regularity, Reticular Order, and Polymorphism", Macromolecules, vol. 32, No. 23, 1999, pp. 7726-7731.
U.S. Appl. No. 13/454,320, filed Apr. 24, 2012, Desbois, et al.
U.S. Appl. No. 13/308,707, filed Dec. 1, 2011, Desbois, et al.
Office Action dated Apr. 28, 2015 in Japanese Patent Application No. 2013/532191 (submitting English translation only).
Office Action as received in the corresponding Korean Patent Application No. 10-2013-7011514 dated Jul. 1, 2017 (English translation only).

* cited by examiner

*Primary Examiner* — Rachel Kahn
(74) *Attorney, Agent, or Firm* — Oblon, McClelland, Maier & Neustadt, L.L.P.

(57) ABSTRACT

A process for producing an activated monomer composition comprising at least one lactam and/or lactone, one catalyst, and one activator permits storage of the resultant monomer composition, since this is stable with respect to polymerization. Said monomer composition is used inter alia in producing a polyamide molding via ring-opening, anionic polymerization.

5 Claims, No Drawings

PROCESS FOR PRODUCING MONOMER COMPOSITIONS AND USE OF THESE FOR PRODUCING A POLYAMIDE MOLDING

This application claims the benefit of U.S. application Ser. Nos. 61/422,678 filed Dec. 14, 2010 and 61/390,627 filed Oct. 7, 2010.

The present invention relates to a process for producing an activated monomer composition comprising a lactam and/or lactone, a catalyst, and an activator. The monomer composition produced by the process of the invention is initially stable with respect to polymerization, and can be used subsequently for the polymerization process.

The present invention further relates to a process for producing a polyamide molding, in particular a cast polyamide molding, via ring-opening, anionic polymerization, using an activated monomer composition.

Polyamide moldings, in particular fiber-reinforced polyamide moldings, have been used increasingly in recent years as materials to replace metallic materials, for example in automobile construction, and can replace either parts within the power train or bodywork parts made of metal. It is often advantageous here when producing a polyamide molding to charge a monomer melt, rather than a polymer melt, to the mold. The lower viscosity can by way of example be used to realize higher filler loadings in the case of a filled or fiber-reinforced molding.

Lactams, such as caprolactam, laurolactam, piperidone, and pyrrolidone, and also lactones, such as caprolactone, can be subjected to ring-opening polymerization in a base-catalyzed anionic polymerization reaction. The material polymerized here is generally a melt made of lactam and/or lactone comprising an alkaline catalyst and what is known as an activator (or cocatalyst or initiator) at temperatures of about 150° C.

The conventional, known, activated anionic polymerization of lactams to give polyamides on an industrial scale is preferably carried out by producing on the one hand a solution of catalyst in lactam and on the other hand a solution of activator in lactam. The constitution of the two solutions is preferably such that mixing in the same ratio gives the desired total formulation.

By way of example, DE-A 1 420 241 describes an anionic polymerization process using lactams in the presence of potassium hydroxide as catalyst, and using 1,6-bis(N,N-dibutylureido)hexane as activator.

An activated anionic lactam polymerization process using sodium caprolactam is described by way of example in Polyamide, Kunststoff Handbuch [Polyamides, Plastics Handbook], vol. 3/4, ISBN 3-446-16486-3, 1998, Carl Hanser Verlag, pp. 49-52, and Macromolecules, vol. 32, No. 23 (1993), p. 7726. DE-A 10 2008 000 352 also describes further prior art.

As previously described in the prior art, anionic polymerization of lactams and of lactones can be achieved in a reactive molding process or reaction injection molding process, where the catalyst and further additives are added during the polymerization process to the lactam melt and/or lactone melt. A disadvantage of the processes of the prior art is that on every occasion prior to charging of the material to the molding apparatus or mixing apparatus, the processor has to incorporate defined amounts of catalyst, of activator, or of other additives into molten lactam, e.g. caprolactam, by stirring with absolute exclusion of water, which is complicated.

The fact that anionic polymerization of lecterns and of lactones has to take place with exclusion of oxygen, carbon dioxide, and water, in order to avoid premature termination of the polymerization process, means that conduct of a polymerization process by reactive molding or reaction injection molding is attended by considerable technical cost.

It would therefore be advantageous for the economics of the process if production of polyamide moldings could use a composition which already comprises the lactam monomer and/or lactone monomer, the catalyst, and the activator, and also optionally further additives, and which could be polymerized directly in the mold, for example via temperature increase.

It is an object of the present invention to provide a process which can produce a monomer composition comprising lactams and/or lactones and which can be polymerized per se without further addition of catalysts and/or of activators. Another object of the present invention consists in providing a process which can produce a polyamide molding and which can be conducted simply and at low cost with use of familiar, simple shaping methods, and which can give polyamide moldings of high quality and with a low residual monomer content.

Another object of the present invention consists in providing a simple process which gives cast polyamide moldings with improved quality.

The content of monomers in the final product should also be minimized, and this is apparent by way of example in less odor. Simplicity of processing should moreover be maximized. By way of example, it should be possible to conduct the process with use of standardized, low-cost processing machinery.

As described in the prior art, particularly when an activator is added (e.g. an isocyanate, acyl halide, or anhydride), the anionic polymerization of lactams proceeds very rapidly (fast polymerization) and even at very low temperatures close to the melting points of the corresponding lactams.

Surprisingly, it has been found that stable monomer compositions can be produced, comprising an initiator and a catalyst, alongside the lactam monomer and/or lactone monomer. Said monomer compositions are initially stable with respect to polymerization. By way of example, this type of monomer composition can be obtained via melting and cooling of the components; particularly rapid crystallization of the monomers (lactam and/or lactone) is a decisive factor here. Said monomer compositions can be stored for a number of months and used subsequently to produce polyamide. Polymerization of this type of monomer composition can be achieved via use of simple processes, for example injection molding, or casting processes, in particular at temperatures in the range from 150 to 200° C.

The present invention provides a process for producing a composition (C) comprising the following components:
  i) at least one monomer (M) selected from lactams and lactones;
  ii) at least one catalyst (K);
  iii) at least one activator (A);
  comprising the following steps:
  a) mixing of components (M), (K), and (A), and also optionally further components at a temperature of from 50 to 200° C., in particular from 50° C. to 160° C., preferably from 50° C. to 100° C.;
  b) cooling of the mixture obtained in step a) to a temperature of from 0° C. to 60° C., preferably from 0° C. to 35° C., with particular preference from 0° C. to 25° C.;
  c) optionally pelletization of the cooled mixture.

The monomer composition obtainable via the described process is a valuable intermediate which can be stored, transported, and handled per se, for example in the form of powder, pellets, or capsules. This ready-mixed solid monomer composition features easy handling. Furthermore, processing (polymerization) does not require any complicated reactive polymerization process comprising two components, for example RTM (Reaction Transfer Molding) or RIM (Reaction Injection Molding).

Because the monomer composition used has low viscosity at the processing temperatures (monomer melt), it is possible to achieve very good saturation of matrix materials (e.g. fillers or fiber mats) present in the mold. The filler content or fiber content of the polyamide component produced by means of the process of the invention can therefore be very high: about 50 to 90% by weight.

It is generally advantageous to minimize contamination, e.g. water, carbon dioxide, and oxygen, in the composition (c). In particular, therefore, all of the components used should be dry and free from oxygen and carbon dioxide, or comprise minimized amounts thereof. It is preferable that the mixing of components (M), (K), and (A) (and optionally of further components) is conducted under an inert gas atmosphere (e.g. under nitrogen). In particular, steps a) to c) are conducted with substantial exclusion of oxygen, carbon dioxide, and water.

The mixing of components in step a) is preferably conducted at a temperature above or equal to the melting point of the monomer(s) (M) used and below a temperature of 200° C., preferably below 160° C., preferably below 120° C., and with particular preference below 100° C. Preference is further given to a temperature below 90° C. The temperature range selected in step a) also depends on the selection of the monomer(s) (M).

The mixing of components in step a) can be conducted in a batch process or continuous process in apparatuses which are suitable and known to the person skilled in the art. By way of example, the mixing of components in step a) can be conducted continuously and/or batchwise in a stirred tank. The mixing of components in step a) can by way of example be conducted continuously in an extruder.

After the mixing of components in step a), it is preferable that the monomer melt is cooled at maximum rate (rapid monomer crystallization). In particular, the cooling of the mixture in step b) to a temperature of from 0° C. to 60° C., preferably from 0° C. to 35° C., particularly preferably from 0° C. to 25° C., is conducted within a period of from 1 second to 5 minutes, preferably within a period of from 1 to 60 seconds. In particular, the cooling of the mixture obtained in step a) can be conducted by using a cold stream of gas (e.g. a stream of nitrogen gas at 0° C.), or what is known as a cold-disk process.

Particularly suitable lactams are caprolactam, piperidone, pyrrolidone, laurolactam, or a mixture of these, preferably caprolactam, laurolactam, or a mixture of these. It is particularly preferable to use caprolactam or laurolactam as monomer (M). It is moreover possible to use, as monomer, a lactone or a mixture of lactam and lactone. An example of lactone that can be used is caprolactone or butyrolactone. The amount of lactone used as comonomer here preferably does not exceed 40% by weight, based on total monomer. It is preferable that the proportion of lactone used as comonomer is no more than 10% by weight, based on total monomer. One preferred embodiment of the invention uses exclusively lactams as monomers (M). Unless otherwise stated, the % by weight data are based on the total amount of the composition.

In particular, monomer (M) used comprises at least one monomer selected from the group consisting of caprolactam, piperidone, pyrrolidone, laurolactam, and caprolactone.

In one preferred embodiment, the composition (C) comprises caprolactam (in particular as sole monomer (M)), and the mixing of components in step a) takes place at a temperature of from 70° C. to 160° C., preferably from 70° C. to 120° C., with particular preference from 70° C. to 100° C., and with further preference from 70° C. to 90° C.

In one preferred embodiment, the composition (C) comprises laurolactam (in particular as sole monomer (M)), and the mixing of components in step a) takes place at a temperature of from 150° C. to 200° C., in particular from 150° C. to 160° C.

The process of the invention preferably uses a catalyst (K) which is a familiar catalyst for the anionic polymerization process. For the purposes of the present invention, a catalyst for the anionic polymerization process is a compound which permits formation of lactam anions. Lactam anions themselves can likewise function as catalyst.

Catalysts of this type are known by way of example from Polyamide, Kunststoffhandbuch [Polyamides, Plastics Handbook], 1998, Carl Hanser Verlag. For the purposes of the present invention it is preferable to use a catalyst selected from the group consisting of sodium caprolactamate, potassium caprolactamate, magnesium bromide caprolactamate, magnesium chloride caprolactamate, magnesium biscaprolactamate, sodium hydride, sodium, sodium hydroxide, sodium ethanolate, sodium methanolate, sodium propanolate, sodium butanolate, potassium hydride, potassium, potassium hydroxide, potassium methanolate, potassium ethanolate, potassium propanolate, and potassium butanolate, and preferably consisting of sodium caprolactamate, potassium caprolactamate, magnesium bromide caprolactamate, magnesium chloride caprolactamate, magnesium biscaprolactamate, sodium hydride, sodium, sodium hydroxide, sodium ethanolate, sodium methanolate, sodium propanolate, sodium butanolate, potassium hydride, potassium, potassium hydroxide, potassium methanolate, potassium ethanolate, potassium propanolate, and potassium butanolate.

It is particularly preferable to use a catalyst (K) selected from the group consisting of sodium hydride, sodium, and sodium caprolactamate; it is particularly preferable to use sodium caprolactamate and/or a solution of sodium caprolactamate in caprolactam (e.g. Bruggolen® (BASF, DE) C100; 18% by weight of sodium caprolactamate in caprolactam).

The molar ratio of monomer (M) to catalyst (K) can be varied widely, but is generally from 1:1 to 10000:1, preferably from 10:1 to 1000:1, particularly preferably from 20:1 to 300:1.

Composition C, which is produced in accordance with the process of the invention, comprises in particular at least one activator (A) for the anionic polymerization process.

For the purposes of this invention, an activator for the anionic polymerization process is a lactam N-substituted by electrophilic moieties (e.g. an acyllactam). Precursors for activated N-substituted lactams of this type can also be activator (A), where these form, with the monomer (M), in situ, an activated lactam. The amount of activator defines typically the number of growing chains, since each activator molecule represents the first unit of a polymer chain. A suitable activator (A) is in general isocyanates, acyl anhydrides, and acyl halides, or respectively the reaction products of these with the monomer (M).

Suitable activators (A) are aliphatic diisocyanates, such as butylene diisocyanate, hexamethylene diisocyanate, octamethylene diisocyanate, decamethylene diisocyanate, undecamethylene diisocyanate, dodecamethylene diisocyanate, methylenebis(cyclohexyl 4-isocyanate), and aromatic diisocyanates, such as tolylene diisocyanate, isophorone diisocyanate, methylenebis(phenyl 4-isocyanate) or polyisocyanates (e.g. isocyanates derived from hexamethylene diisocyanate; Basonat HI 100/BASF SE), and allophanates (e.g. ethyl allophanate). Mixtures of the abovementioned compounds can in particular be used as activator (A).

Other suitable activators (A) are aliphatic diacyl halides, such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, 4,4'-methylenebis(cyclohexyloyl chloride), 4,4'-methylenebis(cyclohexyloyl bromide); and also aromatic diacyl halides, such as tolylmethylenedioyl chloride, tolylmethylenedioyl bromide, isophoronedioyl chloride, isophoronedioyl bromide, 4,4'-methylenebis(phenyl) acyl chloride, and 4,4'-methylenebis(phenyl) acyl bromide. Mixtures of the abovementioned compounds can in particular be used as activator (A).

Particular preference is given to a process wherein activator (A) used comprises at least one compound selected from the group consisting of aliphatic diisocyanates, aromatic diisocyanates, polyisocyanates, aliphatic diacyl halides, and aromatic diacyl halides.

In one preferred embodiment, activator (A) used comprises at least one compound selected from hexamethylene diisocyanate, isophorone diisocyanate, hexamethylenedioyl bromide, hexamethylenedioyl chloride; and particularly preferably hexamethylene diisocyanate.

Activator (A) used can comprise either the pure substance as described above or else preferably a solution of the activator in a solvent, for example in N-methylpyrrolidone.

The molar ratio of monomer (M) to activator (A) can be varied widely and is generally from 1:1 to 10000:1, preferably from 10:1 to 2000:1, particularly preferably from 20:1 to 1000:1.

In particular, the present invention provides a process as described above wherein the composition (C) comprises at least one further component selected from fillers and/or reinforcing materials (F), polymers (P), and further additions (Z).

Said additional components can be added at any step of the production process for the composition (C), for example prior to or together with the addition of catalyst (K) and/or activator (A).

The composition (C) can comprise one or more polymers (P). By way of example, the composition (C) can comprise a polymer and/or oligomer, either of which is formed in situ via polymerization of the monomers comprised within the composition. The amount comprised of said optionally comprised polymer (P) is by way of example from 0 to 40% by weight, preferably from 0 to 20% by weight, particularly preferably from 0 to 10% by weight.

The composition (C) can moreover comprise one or more polymers (P) which are added in the form of a polymer to the composition. Said added polymer can by way of example comprise groups which are suitable for forming block and/or graft copolymers with the polymer formed from the monomers (M). Examples of these groups are epoxy groups, amine groups, carboxy groups, anhydride groups, oxazoline groups, carbodiimide groups, urethane groups, isocyanate groups, and lactam groups.

It is also possible to improve product properties, compatibility of components, and viscosity of the composition (C) by adding at least one polymer (P) selected from the group consisting of polystyrene, styrene copolymers, e.g. styrene-acrylonitrile copolymers (SAN), acrylonitrile-butadiene-styrene copolymers (ABS), or styrene-butadiene copolymers (SB), polyphenylene oxide ethers, polyolefins, e.g. polyethylene (HTPE (high-temperature polyethylene), LTPE (low-temperature polyethylene)), polypropylene, or poly-1-butene, or polytetrafluoroethylene; polyesters, e.g. polyethylene terephthalate (PET); polyamides; polyethers, e.g. polyethylene glycol (PEG), or polypropylene glycol, or polyether sulfones (PESU or PES); polymers made of monomers comprising vinyl groups, e.g. polyvinyl chloride, polyvinylidene chlorides, polystyrene, impact-modified polystyrene, polyvinylcarbazole, polyvinyl acetate, or polyvinyl alcohol; polyisobutylenes, polybutadiene, and polysulfones. It is moreover possible to use, as polymer (P), copolymers which are composed of the monomer units of the abovementioned polymers.

Polymers can be added at any step of the process to produce the composition (C), for example prior to or together with the addition of catalyst (K) and/or activator (A). In particular, the addition of polymer can serve to adjust the viscosity of the composition (C). The polymer (P) can by way of example have been dissolved in the monomer or can be in dispersed form.

In the event that the polymer(s) (P) has been dissolved in the monomer, the proportion of polymer (P) in the composition (C) is preferably less than 40% by weight. In the event that the polymer(s) is in dispersed form in the monomer, the proportion of polymer (P) in the composition (C) is preferably less than 60% by weight.

The composition (C) can also comprise a crosslinking monomer. A crosslinking monomer can be a compound which comprises more than one group which can be copolymerized with the monomer (M). Examples of these groups are epoxy groups, amine groups, carboxy groups, anhydride groups, oxazoline groups, carbodiimide groups, urethane groups, isocyanate groups, and lactam groups. Examples of suitable crosslinking monomers are amino-substituted lactams, such as aminocaprolactam, aminopiperidone, aminopyrrolidone, aminolaurolactam, or a mixture of these, preferably aminocaprolactam, aminopyrrolidone, or a mixture of these, particularly preferably aminocaprolactam.

In one preferred embodiment, the composition (C) comprises at least one filler and/or reinforcing material (F). Fillers (F) and/or reinforcing materials (F) that can be used are organic or inorganic fillers and/or organic or inorganic reinforcing materials (F). By way of example, it is possible to use inorganic fillers, such as kaolin, chalk, wollastonite, talc, calcium carbonate, silicates, titanium dioxide, zinc oxide, graphite, graphenes, glass particles (e.g. glass beads), nanoscale fillers (such as carbon nanotubes), carbon black, phyllosilicates, nanoscale phyllosilicates, nanoscale aluminum oxide ($Al_2O_3$), nanoscale titanium dioxide ($TiO_2$), and nanoscale silicon dioxide ($SiO_2$).

Preference is further given to the use of fibrous material as filler and/or reinforcing material (F). The fillers and/or reinforcing materials (F) are generally selected from the group comprising minerals with particle sizes conventional for thermoplastics applications, examples being kaolin, chalk, wollastonite, or talc, carbon fibers or glass fibers, e.g. ground glass fibers, and also textile structures (wovens and laid scrims) made of unidirectional fibers, preferably glass fibers and carbon fibers. A size which can be used for the fillers or reinforcing materials is the same as the size used in polyamide that is to be processed by methods used for thermoplastics.

By way of example, it is possible to use one or more fibrous materials selected from known inorganic reinforcing fibers, such as boron fibers, glass fibers, carbon fibers, silica fibers, ceramic fibers, and basalt fibers; from organic reinforcing fibers, such as aramid fibers, polyester fibers, nylon fibers, polyethylene fibers; and from natural fibers, such as wood fibers, flax fibers, hemp fibers, and sisal fibers. It is particularly preferable to use glass fibers, in particular chopped glass fibers, carbon fibers, aramid fibers, boron fibers, metal fibers, or potassium titanate fibers.

The abovementioned fibers can be used in the form of short fibers or long fibers, or in the form of mixture of short and long fibers. The average fiber length of the short fibers here is preferably in the range from 0.1 to 1 mm. Preference is further given to fibers with an average fiber length in the range from 0.5 to 1 mm. The long fibers used preferably have an average fiber length above 1 mm, preferably in the range from 1 to 50 mm.

In particular, it is also possible to use mixtures of the abovementioned fillers and/or reinforcing materials (F). It is particularly preferable to select glass fibers and/or glass particles, in particular glass beads, as filler and/or reinforcing material (F).

The composition (C) produced in the process described above preferably comprises from 30 to 90% by weight, in particular from 30 to 80% by weight, preferably from 30 to 50% by weight, with further preference from 50 to 90% by weight, of at least one filler and/or reinforcing material (F).

In one preferred embodiment, the composition (C) can comprise further additions (Z), the amount of which in the composition is from 0 to 5% by weight, preferably from 0 to 4% by weight, particularly preferably from 0 to 3.5% by weight. Examples of additions (Z) that can be added are stabilizers, such as copper salts, dyes, antistatic agents, filler oils, stabilizers, surface improvers, siccatives, demolding auxiliaries, release agents, antioxidants, light stabilizers, PVC stabilizers, lubricants, flame retardants, blowing agents, impact modifiers, and nucleation aids.

It is preferable that the composition (C) comprises, as addition (Z), an impact modifier, in particular a polydiene (e.g. polybutadiene, polyisoprene) comprising anhydride and/or epoxy groups. The glass transition temperature of the polydiene is in particular below 0° C., preferably below –10° C., particularly preferably below –20° C. The polydiene can be based on a polydiene copolymer with polyacrylates, with polyethylene acrylates, and/or with polysiloxanes, and can be produced by the familiar processes (e.g. emulsion polymerization, suspension polymerization, solution polymerization, gas-phase polymerization).

Optional addition of fillers and/or reinforcing materials (F) and of further additions (Z) can take place at any step of the process for producing the composition (C), for example prior to or together with the addition of catalyst (K) and/or activator (A).

The present invention further provides the use of a composition (C) obtainable via a process described above of the invention for producing a polyamide molding.

The present invention also provides a process for producing a polyamide molding, in particular a cast polyamide molding, via anionic polymerization, where the polymerization process uses at least one monomer (M1) which has been selected from lactams and lactones (preferably a cyclic lactam) and which, prior to the start of the polymerization process, has been processed with at least one additive (X1) to give pellets, and where the pellets comprising at least one monomer (M1) are then polymerized, where the mixture made of monomer (M1) with additive (X1) is optionally mixed in solid form or melt prior to or during the polymerization process with at least one further monomer (M2) selected from lactams and lactones (preferably a cyclic lactam) and/or at least one further additive (X2).

In one preferred embodiment of the invention here, the step of polymerization of the pellets comprising at least one monomer (M1) selected from lactams and lactones (preferably from a cyclic lactam (M1)) directly follows the production of the pellets made of at least one monomer (M1) (preferably of a cyclic lactam (M1)) and of at least one additive (X1). The production of the pellets made of at least one monomer (M1) (preferably a cyclic lactam) and of at least one additive (X1) here is also termed "compounding" or "precompounding".

The at least one monomer (M1) (preferably a cyclic lactam) provided with at least one additive (X1) can therefore be processed directly in a lactam manufacturing system to give pellets (or comparable solid particles). These pellets can then be used by the processor by way of example for producing a cast polyamide molding, and, unlike in the processes known from the prior art, do not require further addition of additives. However, admixture of further additives continues to be an option.

The term "pellets" here also covers other "precompounded" particles of a size from 1 mm to 20 mm, preferably of average size from 2 to 15 mm, and particularly preferably particles of average size from 4 mm to 10 mm. These particles can have various shapes. By way of example, they can be barrel-shaped, or spherical, or else can take the form of flakes.

In one embodiment of the invention, the optional step of mixing with a further monomer (M2) selected from lactams and lactones (preferably lactam) and/or at least one further additive (X2) is carried out.

In another embodiment, the optional step of mixing with a further monomer (M2) and/or at least one further additive (X2) is not carried out.

In one preferred embodiment of the process of the invention, the at least one additive (X1) and the optional further additive (X2) have been respectively mutually independently selected from the group comprising catalysts and activators. Catalysts (K) and activators (A) that can be used are the compounds mentioned at an earlier stage above in the context of the process for producing a composition (C).

The present invention further provides a cast polyamide molding that can be produced by the process of the invention, and also provides a solid caprolactam preparation which comprises amounts <90% by weight, preferably <60% by weight, and particularly preferably <40% by weight, of at least one additive (X1).

Additives and/or additions (Z) can easily be added to lactams, e.g. ε(epsilon)-caprolactam, during the compounding process, examples being the abovementioned additions (Z), catalysts (K), and activators (A), in particular dyes, desiccants, activators, or catalysts, chain extenders, stabilizers, or impact modifiers.

It is equally possible to select other compositions, by way of example adding a precompounded melt of activator and also of catalyst to a lactam melt, to which it is also possible to add further additives in a further step.

In one preferred embodiment of the process of the invention, the processing of the at least one monomer (M1)

selected from lactams and from lactones (preferably at least one cyclic lactam) with the at least one additive (X1) to give pellets is achieved via mixing of the dry components.

The anionic polymerization process is, for example, frequently carried out by melting each monomer component (normally 2 components (M1) and (M2)) with exclusion of moisture, adding catalyst (e.g. lactamate) to one component, and adding the activator (e.g. isocyanate derivative) to another component, and then mixing the two components, with stirring, using a standard stirrer or suitable mixing machine. It is also possible here to add further additions, for example from 3 to 50% by weight, preferably from 8 to 18% by weight, of impact modifiers, stabilizers, flame retardants, or other additives.

The cast-polymerization apparatus should preferably have, for each individual melt, a melt circuit extending as far as the casting head, and the melt is kept in motion through this by continuous pumped circulation within the hoses and lines. However, said circuit is not essential for carrying out the process of the invention.

Monomers (M1) and/or (M2) that can be used are the abovementioned monomers (M), preferably cyclic lactams having from 6 to 16 carbon atoms, with particular preference laurolactam, and particularly preferably ε(epsilon)-caprolactam. The monomer (M1) and the monomer (M2) here can be identical or different.

The additive (X1) and the additive (X2) can equally be identical or different.

Additions (Z) as described above can also be used. In particular, abovementioned fillers and/or reinforcing materials (F) can be used, and addition of the fillers and/or reinforcing materials (F) here is mutually independent, prior to the polymerization process in the form of further additive or during the polymerization process.

Fillers and/or reinforcing materials (F) as described above can be used. It is preferable that the fillers and/or reinforcing materials (F) are selected from the group comprising minerals with particle sizes conventional for thermoplastics applications, examples being kaolin, chalk, wollastonite, or talc, carbon fibers or glass fibers, e.g. ground glass fibers, and also textile structures (wovens and laid scrims) made of unidirectional fibers, preferably glass fibers and carbon fibers. A size which can be used for the fillers or reinforcing materials is the same as the size used in polyamide that is to be processed by methods used for thermoplastics.

Catalyst (K) used can comprise at least one of the compounds mentioned above in relation to component (K). It is preferable that an alkali metal lactamate or alkaline earth metal lactamate is involved, preferably in the form of solution in lactam, particularly preferably sodium caprolactamate in ε(epsilon)-caprolactam.

Activator (A) used can comprise at least one of the compounds mentioned above in relation to component (A). The activator (A) preferably involves N-acyllactams or acyl chlorides or, preferably, aliphatic isocyanates, particularly preferably oligomers of hexamethylene diisocyanate. Activator (A) used can either comprise a pure substance or else preferably a solution, for example N-methylpyrrolidone.

Further additions (Z) and/or additives (X) can be the additions (Z) mentioned at an earlier stage above in the context of the process for producing a composition (C). By way of example, the additions (Z) involve impact modifiers, flame retardants, nucleation aids, dyes, filler oils, stabilizers, surface improvers, siccatives, and demolding aids.

Other preferred embodiments of the invention are unfilled, filled, and/or reinforced polyamide compositions produced via anionic polymerization of a mixture (composition (C) comprising (or composed of):

a) from 10 to 95% by weight of at least one monomer (M) selected from lactams and lactones; preferably from 40 to 95% by weight of cyclic lactam having from 6 to 15 carbon atoms in the ring, preferably laurolactam, and particularly preferably ε(epsilon)-caprolactam, or a mixture of said lactams, b) from 0.8 to 8% by weight of catalyst (K), preferably a mixture of about 15 to 20% by weight of lactamate salt, among which preference is given to sodium lactamate, in ε(epsilon)-caprolactam, c) from 0.5 to 5% by weight of activator (A), preferably aliphatic isocyanates or N-acyllactams, d) from 1 to 90% by weight, preferably 1 to 88% by weight, preferably from 1 to 50% by weight, preferably from 3 to 30% by weight, particularly preferably from 5 to 15% by weight, of fillers and/or reinforcing materials (F), preferably glass fibers, among which preference is given to short glass fibers, ground carbon fibers, and textiles made of glass fibers and of carbon fibers, e) from 0 to 20% by weight of other additives and/or additions (Z), e.g. impact modifiers, flame retardants, nucleation aids, dyes, filler oils, stabilizers, surface improvers, siccatives, or demolding aids.

One or more components b), c), and d) is/are incorporated into the cyclic lactams a) here before the compounding process ends, and this provides advantages in the processing of said lactams to give polyamides.

In one preferred embodiment, the present invention provides a process for producing a polyamide molding, where a composition (C) obtainable (or obtained) via a process described above (process for producing a composition (C)) is polymerized via heating to a temperature of from 120° C. to 250° C.

It is generally advantageous to minimize contamination, e.g. water, carbon dioxide, and oxygen, these being substances which can lead to termination of the anionic polymerization process. In particular, therefore, all of the components used should be dry and free from oxygen and carbon dioxide. It is preferable that the polymerization process is conducted with substantial exclusion of oxygen, carbon dioxide, and water.

The present invention in particular provides a process for producing a polyamide molding, as stated above, comprising the following steps:

i) melting the composition (C) at a temperature of from 50° C. to 200° C., in particular from 50° C. to 160° C., preferably from 50° C. to 100° C.;

j) charging the molten composition (C) to a mold cavity;

k) polymerizing the composition (C) via heating to a temperature of from 120° C. to 250° C.

Melting of the composition (C) preferably takes place at a temperature above or equal to the melting point of the monomer(s) (M) used and below a temperature of 160° C., preferably below 150° C., preferably below 120° C., with particular preference below 100° C., with further preference below 90° C. The temperature range selected for step a) therefore depends on the selection of the monomer(s) (M).

The molten composition (C) can be charged to a mold cavity by means of any suitable shaping process (e.g. injection molding, casting processes), and can be polymerized in the cavity via temperature increase.

Preference is given to a process for producing a polyamide molding as stated above where, prior to charging of the molten composition, the mold cavity comprises at least one filler and/or reinforcing material (F). In one preferred embodiment, the mold cavity comprises a woven fiber material and/or a fiber network, for example a glass fiber mat and/or a glass fiber network.

It is moreover possible to charge a filler and/or reinforcing material (F) to the mold cavity together with the molten composition (C). This can be achieved by means of known processes (for example in an injection molding apparatus or other molding apparatus). The optionally added filler and/or reinforcing material (F) can be selected from the fillers and/or reinforcing materials mentioned above in the context of the process of the invention for producing a composition (C).

The process of the invention can produce polyamide moldings with high content of fillers and/or reinforcing materials (F). In particular, the invention provides a process as described above wherein the content of filler and/or reinforcing material in the polyamide molding is in the range from 30 to 90% by weight, in particular from 30 to 80% by weight, preferably from 30 to 50% by weight, with further preference from 50 to 90% by weight. The data in % by weight are based on the total weight of the polyamide molding.

The present invention further provides the use of a composition (C) obtainable via a process as described above for producing a polyamide molding, in particular a filled and/or fiber-reinforced molding. The content of filler and/or fibrous material in the polyamide molding is in particular in the range from 30 to 90% by weight.

The present invention further provides a polyamide molding, in particular a cast polyamide molding, which can be produced by the process of the invention.

The polyamide moldings produced by the process of the invention can in particular be used as material for producing components of automobile bodywork, e.g. passenger compartment, wheel surround, and also for producing automobile components such as frame cladding and dashboards, and for the interior of passenger compartments. The polyamide moldings can moreover be used as inliners for tanks, gear wheels, housings, packaging films, and coatings.

In principle, the polyamide moldings produced by the process of the invention are suitable for any of the housings for small electrical devices, such as mobile telephones, laptops, iPads, or generally plastics items intended to imitate metal.

The examples below provide further explanation of the invention.

Example 1

834 g/h (7062 mmol/h) of ε(epsilon)-caprolactam, 115 g/h (144 mmol/h) of Bruggolen® C 10 catalyst (17% w/w ε(epsilon)-caprolactamate in ε(epsilon)-caprolactam) and 51 g/h (14 mmol/h) of Bruggolen® C 20 initiator (80% w/w capped diisocyanate in ε-caprolactam) were mixed in a PTW 16 extruder at 70° C. and 130 rpm, and 1.0 kg/h, using 2 mm die. The mixture was cooled by a cold stream of gas (coldfeed 0° C.). The mixture was pelletized at room temperature under nitrogen.

One week later, the resultant caprolactam pellets were injection-molded at a product temperature of 80° C. in an Arburg 270 S injection molding machine with vertically arranged injection unit. The temperature profile of the cylinder was 60° C./65° C./70° C./75° C. Injection time was 0.8 s, and hold pressure time was 2 s. The melt was injected into a mold using a mold temperature of 150° C. The polymerization process was then allowed to proceed for 5 minutes. The resultant polyamide molding was removed from the mold.

The content of residual monomer (caprolactam) in the polyamide product was determined chromatographically. The intrinsic viscosity of the polyamide product was determined to ISO 307 at 5° C. in 96% sulfuric acid. The polymer obtained comprised 0.9% by weight of residual caprolactam, and its intrinsic viscosity was 195.

Example 2

834 g/h (7062 mmol/h) of ε(epsilon)-caprolactam, 3000 g/h of glass beads, 115 g/h (144 mmol/h) of Bruggolen® C 10 catalyst (17% w/w ε(epsilon)-caprolactamate in ε-caprolactam) and 51 g/h (14 mmol/h) of Bruggolen® C 20 initiator (80% w/w capped diisocyanate in ε(epsilon)-caprolactam) were mixed in a PTW 16 extruder at 70° C. and 130 rpm, and 3.0 kg/h, using 2 mm die. The mixture was cooled by a cold stream of gas (coldfeed 0° C.).

The mixture was pelletized at room temperature under nitrogen.

One week later, the resultant caprolactam pellets were injection-molded at a product temperature of 80° C. The melt was injected at T=150° C. into a mold cavity. The polymerization process was then allowed to proceed for 5 minutes. The polyamide molding obtained was removed from the mold. The resultant polymer comprised 1.5% by weight of residual caprolactam, and its intrinsic viscosity was 230.

Example 3

The monomer composition produced as in inventive example 1 was stored for one month. The polymerization process was then carried out as described in inventive example 1. The resultant polyamide comprised 0.95% by weight of residual caprolactam monomer content, and its intrinsic viscosity was 191.

It was therefore possible to demonstrate that the monomer compositions produced by means of the process of the invention are stable over a long period, i.e. even after a long time they can still undergo full polymerization.

Example 4

A composition was produced as stated in inventive example 1, but the mixing of the ε-caprolactam, of the catalyst, and of the initiator here was conducted in a round-bottomed flask, with use of a magnetic stirrer. The components were charged to the flask in a glovebox under dry nitrogen. After production of the composition, the aperture of the flask was sealed and the system was removed from the glovebox. The composition was cooled in an icebath.

The composition was then stored at room temperature for one week. The polymerization process was then conducted for 10 min at a temperature of 150° C. The polyamide product comprised 0.85% by weight of residual caprolactam monomer, and its intrinsic viscosity was 200.

Examples 5.1 to 5.8

Catalyst used for the following examples 5.1 to 5.8 comprised a solution of sodium lactamate in ε(epsilon)-caprolactam (Addonyl® NL catalyst, Rhein Chemie), and the activator was an oligomer derived from hexamethylene diisocyanate, dissolved in N-methylpyrrolidone (Addonyl® 8108, Rhein Chemie).

The components were melted under dry nitrogen and then stirred for 30 seconds under dry nitrogen in a glass container thermostated to 100° C. The ε(epsilon)-caprolactam melt mixed with the additives was introduced gravimetrically into a steel mold heated to 150° C. The product was demolded after 5 minutes. The shape and the appearance of the molding were evaluated, as also was the content of residual monomers (ε(epsilon)-caprolactam). The caprolactam preparations used in the comparative examples were produced separately under dry inert gas and stored in watertight plastics containers.

Comparative Example 5.1

The following compositions were produced:
Catalyst melt: 1.5 g of catalyst were incorporated by stirring under inert gas into a mixture made of 100 g of ε(epsilon)-caprolactam from BASF SE, melted at 90° C.
Activator melt: 1.0 g of activator were incorporated at 90° C. by stirring under inert gas into a mixture made of 100.0 g of ε(epsilon)-caprolactam.
The two melts were intimately mixed under dry nitrogen by stirring (30 seconds) in a flask heated to 90° C., and were poured gravimetrically into the steel mold preheated to 150° C. The product was demolded after 5 minutes. This gave a homogeneous block.
Appearance: good, residual caprolactam 1.1%

Comparative Example 5.2: Addition of Short Glass Fibers

A catalyst melt was produced as described in example 5.1.
Activator melt: 1.0 g of activator and 40 g of commercially available short glass fibers with size for polyamides (OCV) were incorporated at 90° C. by stirring under inert gas into a mixture made of 100.0 g of ε(epsilon)-caprolactam.
The two melts were intimately mixed under dry nitrogen by stirring (30 seconds) in a flask heated to 90° C., and were poured gravimetrically into the steel mold preheated to 150° C. The product was demolded after 5 minutes. This gave a homogeneous block.
Appearance: good, residual caprolactam 3.6%, odor of caprolactam Comparative example 5.3: No Exclusion of Water A catalyst melt was produced as described in inventive example 5.1.
Activator melt: 1.0 g of activator was incorporated at 90° C. by stirring into a mixture made of 100.0 g of ε(epsilon)-caprolactam.
The two melts were intimately mixed by stirring (5 seconds) in a flask heated to 90° C., and were poured gravimetrically into the steel mold preheated to 150° C. Operations were not carried out under dry inert gas (nitrogen). The product was demolded after 5 minutes. This gave a homogeneous block.
Appearance: poor (streaking, discoloration), residual caprolactam 5.1%, odor of caprolactam Comparative Example 5.4: Addition of Short Glass Fibers and no Exclusion of Water A catalyst melt was produced as described in inventive example 5.1.

Activator melt: 1.0 g of activator and 40 g of commercially available short glass fibers with size for polyamides (OCV) were incorporated at 90° C. by stirring into a mixture made of 100.0 g of ε(epsilon)-caprolactam.
The two melts were intimately mixed by stirring (5 seconds) in a flask heated to 90° C., and were poured gravimetrically into the steel mold preheated to 150° C. Operations were not carried out under dry inert gas (nitrogen). The product was demolded after 5 minutes. This gave a homogeneous block.
Appearance: very poor (streaking, yellowing), residual caprolactam 8.7%, strong odor of caprolactam Example 5.5

101.5 g of solid ε(epsilon)-caprolactam in the form of flakes already comprising 1.5 g of catalyst were mixed under inert gas with 101.0 g of solid ε(epsilon)-caprolactam which already comprised 1.0 g of activator, and melted, and stirred for 5 seconds.
The melt was poured at 90° C. into the steel mold preheated to 150° C. The product was demolded after 5 minutes. This gave a homogeneous block.
Appearance: good, residual caprolactam 1.1%

Example 5.6: Addition of Short Glass Fibers During Compounding 101.5 g of solid ε(epsilon)-caprolactam in the form of flakes already comprising 1.5 g of catalyst were mixed with 141.0 g of solid ε(epsilon)-caprolactam which already comprised 1.0 g of activator, and 40 g of commercially available short glass fibers with size for polyamides (OCV), and melted, and stirred for 5 seconds.
The melt was poured at 90° C. into the steel mold preheated to 150° C. The product was demolded after 5 minutes. This gave a homogeneous block.
Appearance: good, residual caprolactam 1.2%

Example 5.7: Addition of Short Glass Fibers Prior to Processing 101.5 g of solid ε(epsilon)-caprolactam in the form of flakes already comprising 1.5 g of catalyst were mixed with 101.0 g of solid ε(epsilon)-caprolactam which already comprised 1.0 g of activator, and 40 g of commercially available short glass fibers with size for polyamides (OCV), and melted, and stirred for 5 seconds.
The melt was poured at 90° C. into the steel mold preheated to 150° C. The product was demolded after 5 minutes. This gave a homogeneous block.
Appearance: good, residual caprolactam 1.6%

Example 5.8: (Only 1 Component)

202.5 g of solid ε(epsilon)-caprolactam in the form of flakes already comprising 1.5 g of catalyst and 1.0 g of activator were melted under inert gas, and not stirred.
The melt was poured at 90° C. into the steel mold preheated to 150° C. The product was demolded after 5 minutes. This gave a homogeneous block.
Appearance: good, residual caprolactam 1.0%
The inventive examples and comparative examples 5.1 to 5.8 demonstrate that the process of the invention can produce better polyamide moldings at lower cost.
The process of the invention also provides products with better appearance; in most cases it is also possible to reduce odor markedly. The latter feature can be explained via lower residual content of unreacted monomers.

The invention claimed is:

1. A process for producing a solid crystalline monomer composition (C), which can be stored without polymerization of the monomer, the composition comprising:
   i) at least one caprolactam monomer (M);
   ii) at least one catalyst (K); and
   iii) at least one activator (A);
   the process comprising:
   a) mixing of components (M), (K), and (A), and also optionally further components at a temperature of from 70 to 160° C.;
   b) cooling and crystallizing the mixture obtained in step a) to a temperature of from 0° C. to 25° C.; and
   c) optionally pelletizing the cooled mixture, to obtain a solid crystalline monomer composition, which can be stored without polymerization of the monomer,
   wherein the molar ratio of monomer (M) to catalyst (K) is from 1:1 to 10,000:1,
   wherein the at least one catalyst (K) is selected from the group consisting of sodium caprolactamate, potassium caprolactamate, magnesium bromide caprolactamate, magnesium chloride caprolactamate, magnesium bis-caprolactamate, sodium hydride, sodium, sodium hydroxide, sodium ethanolate, sodium methanolate, sodium propanolate, sodium butanolate, potassium hydride, potassium, potassium hydroxide, potassium methanolate, potassium ethanolate, potassium propanolate, and potassium butanolate,
   wherein the at least one activator (A) comprises at least one of an aliphatic diisocyanate, an aromatic diisocyanate, and a polyisocyanate, and
   wherein in b) the mixture is cooled to a temperature of from 0° C. to 25° C. within a period of from 1 to 60 seconds with a cold stream of gas.

2. The process according to claim 1, wherein the composition (C) further comprises at least one component selected from the group consisting of a filler, a reinforcing material (F), a polymer (P), and a further addition (Z).

3. A process for producing a polyamide molding, comprising polymerizing a solid crystalline composition (C) via heating to a temperature of from 120 to 250° C., the composition (C) comprising
   i) at least one caprolactam monomer (M);
   ii) at least one catalyst (K); and
   iii) at least one activator (A);
   wherein the molar ratio of monomer (M) to catalyst (K) is from 1:1 to 10,000:1,
   wherein the at least one catalyst (K) is selected from the group consisting of sodium caprolactamate, potassium caprolactamate, magnesium bromide caprolactamate, magnesium chloride caprolactamate, magnesium bis-caprolactamate, sodium hydride, sodium, sodium hydroxide, sodium ethanolate, sodium methanolate, sodium propanolate, sodium butanolate, potassium hydride, potassium, potassium hydroxide, potassium methanolate, potassium ethanolate, potassium propanolate, and potassium butanolate,
   wherein the at least one activator (A) is selected from the group consisting of an aliphatic diisocyanate, an aromatic diisocyanate, and a polyisocyanate,
   obtainable via a process comprising:
   a) mixing of components (M), (K), and (A), and also optionally further components at a temperature of from 70 to 160° C.;
   b) cooling and crystallizing the mixture obtained in a) to a temperature of from 0° C. to 25° C. within a period of from 1 to 60 seconds with a cold stream of gas; and
   c) optionally pelletizing the cooled mixture,
   wherein the composition is stored before polymerization.

4. The process for producing a polyamide molding according to claim 3, comprising:
   i) melting the composition (C) at a temperature of from 70° C. to 160° C.;
   j) charging the molten composition (C) to a mold cavity;
   k) polymerizing the composition (C) via heating to a temperature of from 120° C. to 250° C.

5. The process for producing a polyamide molding according to claim 3, wherein the polyamide molding comprises a filler and/or of reinforcing material in the range from 30 to 90% by weight.

* * * * *

UNITED STATES PATENT AND TRADEMARK OFFICE
CERTIFICATE OF CORRECTION

PATENT NO. : 10,538,624 B2
APPLICATION NO. : 13/268228
DATED : January 21, 2020
INVENTOR(S) : Dietrich Scherzer et al.

It is certified that error appears in the above-identified patent and that said Letters Patent is hereby corrected as shown below:

On the Title Page

In Column 2, item (56), other publications, Line 9, delete "Kenststoff" and insert -- Kunststoff --.

In the Specification

In Column 1, Line 66, delete "lecterns" and insert -- lactams --.

In Column 4, Line 23, delete "Kunststofthandbuch" and insert -- Kunststoff Handbuch --.

In the Claims

In Column 16, Line 4, Claim 3, delete "comprising" and insert -- comprising: --.

Signed and Sealed this
Sixteenth Day of June, 2020

Andrei Iancu
*Director of the United States Patent and Trademark Office*